(12) United States Patent  
Shimada

(10) Patent No.: US 12,055,225 B2
(45) Date of Patent: Aug. 6, 2024

(54) FLUID CONTROL DEVICE

(71) Applicant: EAGLE INDUSTRY CO., LTD., Tokyo (JP)

(72) Inventor: Yoshiyuki Shimada, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/928,582

(22) PCT Filed: May 24, 2021

(86) PCT No.: PCT/JP2021/019530
§ 371 (c)(1),
(2) Date: Nov. 29, 2022

(87) PCT Pub. No.: WO2021/246214
PCT Pub. Date: Dec. 9, 2021

(65) Prior Publication Data
US 2023/0228342 A1 Jul. 20, 2023

(30) Foreign Application Priority Data

Jun. 4, 2020 (JP) .................................. 2020-097472

(51) Int. Cl.
*F16K 11/07* (2006.01)
*F16K 1/38* (2006.01)
(Continued)

(52) U.S. Cl.
CPC ............ *F16K 11/0716* (2013.01); *F16K 1/38* (2013.01); *F16K 31/1221* (2013.01); *F15B 1/04* (2013.01); *F15B 13/02* (2013.01)

(58) Field of Classification Search
CPC .. F16K 11/0716; F16K 11/0708; F16K 3/267; F16K 3/246; F16K 3/32; F16K 3/34; F16K 1/38; F16K 1/54
See application file for complete search history.

(56) References Cited

U.S. PATENT DOCUMENTS 4,238,112 A * 12/1980 Derozier ................. F15B 13/04
251/324
4,706,932 A 11/1987 Yoshida et al. ......... F16K 31/12
(Continued)

FOREIGN PATENT DOCUMENTS

| JP | 257779 | 2/1990 | ............. F16K 31/12 |
| JP | 2604568 | 5/2000 | ............. F15B 21/14 |
| JP | 2018168914 | 11/2018 | ............. F16K 3/314 |

OTHER PUBLICATIONS

Examination Report issued in Indian Patent Appln. Serial No. 202227070137, dated Jan. 18, 2023, 7 pages.
(Continued)

*Primary Examiner* — Kelsey E Cary
(74) *Attorney, Agent, or Firm* — HAYES SOLOWAY P.C.

(57) ABSTRACT

A fluid control device includes a housing partitioned into an input chamber and an output chamber by a housing land portion extending on the radially inner side, a spool arranged inside the housing and provided with a spool land portion that is configured to reciprocatively slide with respect to the housing land portion and that extends on a radially outer side of the spool, and a biasing member configured to bias the spool toward a valve closing position, wherein upon receiving drive force from an exterior, the spool is moved against bias force of the biasing member, and the input chamber and the output chamber communicate with each other, the spool includes a large diameter portion arranged in the input chamber and having a larger diameter than the spool land portion, and the large diameter portion and the housing land portion form a poppet valve structure.

3 Claims, 8 Drawing Sheets

(51) Int. Cl.
  *F16K 31/122* (2006.01)
  *F15B 1/04* (2006.01)
  *F15B 13/02* (2006.01)

(56) References Cited

U.S. PATENT DOCUMENTS

| | | | |
|---|---|---|---|
| 5,076,144 | A | 12/1991 | Karakama et al. .............. 91/436 |
| 5,271,430 | A * | 12/1993 | Muruyama ................ F16K 3/24 |
| | | | 137/484.4 |
| 9,657,850 | B2 | 5/2017 | Patterson ................. F16K 11/04 |
| 2016/0290516 | A1 | 10/2016 | Beschorner et al. ......................... |
| | | | F16K 11/0712 |

OTHER PUBLICATIONS

International Preliminary Report on Patentability issued in PCT/JP2021/019530, dated Dec. 6, 2022, 4 pages.

International Search Report and Written Opinion issued in PCT/JP2021/019530, dated Aug. 10, 2021, with English translation, 12 pages.

Second Examination Report issued in Indian Patent Appln. Serial No. 202227070137, dated Feb. 5, 2024, 2 pages.

European Search Report issued in European Patent Appln. Serial No. 2181815.8, dated May 8, 2024, 8 pages.

* cited by examiner

FLUID CONTROL DEVICE

TECHNICAL FIELD

The present invention relates to a fluid control device that switches opened and closed states of a flow passage, and in particular, relates to a fluid control device that controls a flow rate of a pressure fluid stored under pressure in an accumulator.

BACKGROUND ART

Conventionally, in order to drive a vehicle, a construction machine, an industrial machine, etc., a fluid circuit in which a pressure fluid such as oil flows from a main pump into an actuator and a load is driven is used. Such a fluid circuit provided with an accumulator in which part of a fluid returned from the actuator is stored under pressure, and a fluid control device that switches opened and closed states between the accumulator and an outlet side flow passage of the main pump, the fluid circuit with which energy efficiency is enhanced by storing part of the returned fluid under pressure in the accumulator by making the fluid control device switch to a closed state, and regenerating the pressure fluid stored under pressure in the accumulator in the outlet side flow passage of the main pump by making the fluid control device switch to an opened state has been increasingly used.

A fluid control device shown in Patent Citation 1 is a normally closed type spool valve in which a spool is moved in a housing by a pilot pressure from a pilot pump. Specifically, an interior of the housing is partitioned into a pilot chamber arranged in one end of the housing so as to be switchably connected to the pilot pump and a tank, an output chamber connected to an outlet side flow passage of a main pump, an input chamber communicating with an accumulator, and a drain chamber arranged in the other end of the housing so as to be connected to the tank by first, second, and third land portions of the spool in order from the one end to the other end.

The second land portion of the spool is a valve element part that switches opened and closed states between the input chamber and the output chamber. Notches serving as inner flow passages which are open to the output chamber and closed on the input chamber side are provided in an outer periphery of the second land portion.

Bias means that biases the spool toward the pilot chamber is arranged in the drain chamber. When the pilot chamber is connected to the tank, the spool is biased by the bias means and the input chamber and the output chamber are closed by the second land portion. Meanwhile, when the pilot chamber is connected to the pilot pump, by the pilot pressure from the pilot pump, the spool is moved toward the drain chamber against bias force of the bias means, and the input chamber and the output chamber communicate with each other through the notches of the second land portion.

CITATION LIST

Patent Literature

Patent Citation 1: JP 2018-168914 A (Page 8, FIG. 5)

SUMMARY OF INVENTION

Technical Problem

In Patent Citation 1, at the time of closing the input chamber and the output chamber, by having a sufficiently long outer peripheral surface of the second land portion, that is, a sufficiently long size from a closed end portion of the notch to the input chamber, the pressure fluid stored under pressure in the accumulator is prevented from leaking out from the input chamber to the output chamber. However, by the long size from the closed end portion of the notch to the input chamber, it takes time to make the input chamber and the output chamber communicate with each other through the notches. Thus, there is a possibility that control responsiveness is deteriorated.

The present invention is achieved focusing on such a problem, and an object thereof is to provide a fluid control device having favorable control responsiveness while preventing fluid leakage from an input chamber to an output chamber.

Solution to Problem

In order to solve the foregoing problem, a fluid control device according to the present invention is a fluid control device of normally closed type including: a housing partitioned into an input chamber and an output chamber by a housing land portion extending on a radially inner side of the housing; a spool arranged inside the housing and provided with a spool land portion that is configured to reciprocatively slide with respect to the housing land portion and that extends on a radially outer side of the spool; and a biasing member configured to bias the spool toward a valve closing position of the spool, wherein upon receiving drive force from an exterior, the spool is moved against bias force of the biasing member, and the input chamber and the output chamber communicate with each other, the spool includes a large diameter portion arranged in the input chamber and having a larger diameter than the spool land portion, and the large diameter portion and the housing land portion form a poppet valve structure According to the aforesaid feature of the present invention, at the closing time where the drive force from the exterior is not received, it is possible to reliably seal a portion between the input chamber and the output chamber by a poppet valve including the large diameter portion and the housing land portion in addition to closing of a spool valve by the housing land portion and the spool land portion. By forming the short spool land portion, the input chamber and the output chamber quickly communicate with each other when the spool is moved by the drive force from the exterior. In such a way, it is possible to improve control responsiveness of the fluid control device.

It may be preferable that the large diameter portion is formed in a taper shape abutted with an opening edge of the housing land portion, and a twisted portion having a smaller diameter than the spool land portion is formed between the large diameter portion and the spool land portion. According to this preferable configuration, by forming the twisted portion, since the taper-shaped large diameter portion extends on the radially inner side of the spool land portion, it is possible to reliably seat the large diameter portion at the opening edge of the housing land portion. Since special processing is not required for the housing, manufacturing is simple and easy.

It may be preferable that the spool has a pressure receiving surface having an area equal to an area of an axial projection plane of a radially outer part of the large diameter portion with respect to an opening edge of the housing land portion, and the pressure receiving surface receives a force of fluid in a closing direction of the spool balanced with a force in an opening direction of the spool which is generated by the fluid of the input chamber which acts on the radially outer part. According to this preferable configuration, the area of the pressure receiving surface is the same as the axial area of the radially outer part. Thus, by the pressure receiving surface, the force in the opening direction applied to the spool and the force in the closing direction are balanced, and it is possible to precisely perform opening/closing control of the input chamber and the output chamber by the spool.

It may be preferable that a recessed portion communicating with a space of the input chamber on a side opposite to the housing land portion is formed inside the large diameter portion, a communication hole providing communication between a space in the recessed portion and the input chamber is formed in the spool, the pressure receiving surface is provided in the recessed portion, a pressure receiving body separating the space of the recessed portion from the space opposite to the housing land portion in a sealed manner is arranged inside of the spool so as to be relatively slidable with respect to the spool, and the large diameter portion is slidable with respect to the housing. According to this preferable configuration, since the large diameter portion is slidable with respect to the housing, it is possible to form the poppet valve structure with a simple structure, and reciprocating movement of the spool is stabilized.

It may be preferable that the pressure receiving body is a separate body from the housing. According to this preferable configuration, since precision at the time of assembling the fluid control device is not required, an assembling task becomes simple and easy.

DESCRIPTION OF EMBODIMENTS

Modes for implementing a fluid control device according to the present invention will be described below based on embodiments.

First Embodiment

With a mode in which a fluid control device according to a first embodiment of the present invention is a spool type flow rate control valve 1 used in a hydraulic circuit of a shovel loader as an example, the fluid control device will be described with reference to FIGS. 1 to 7.

Figure 1:
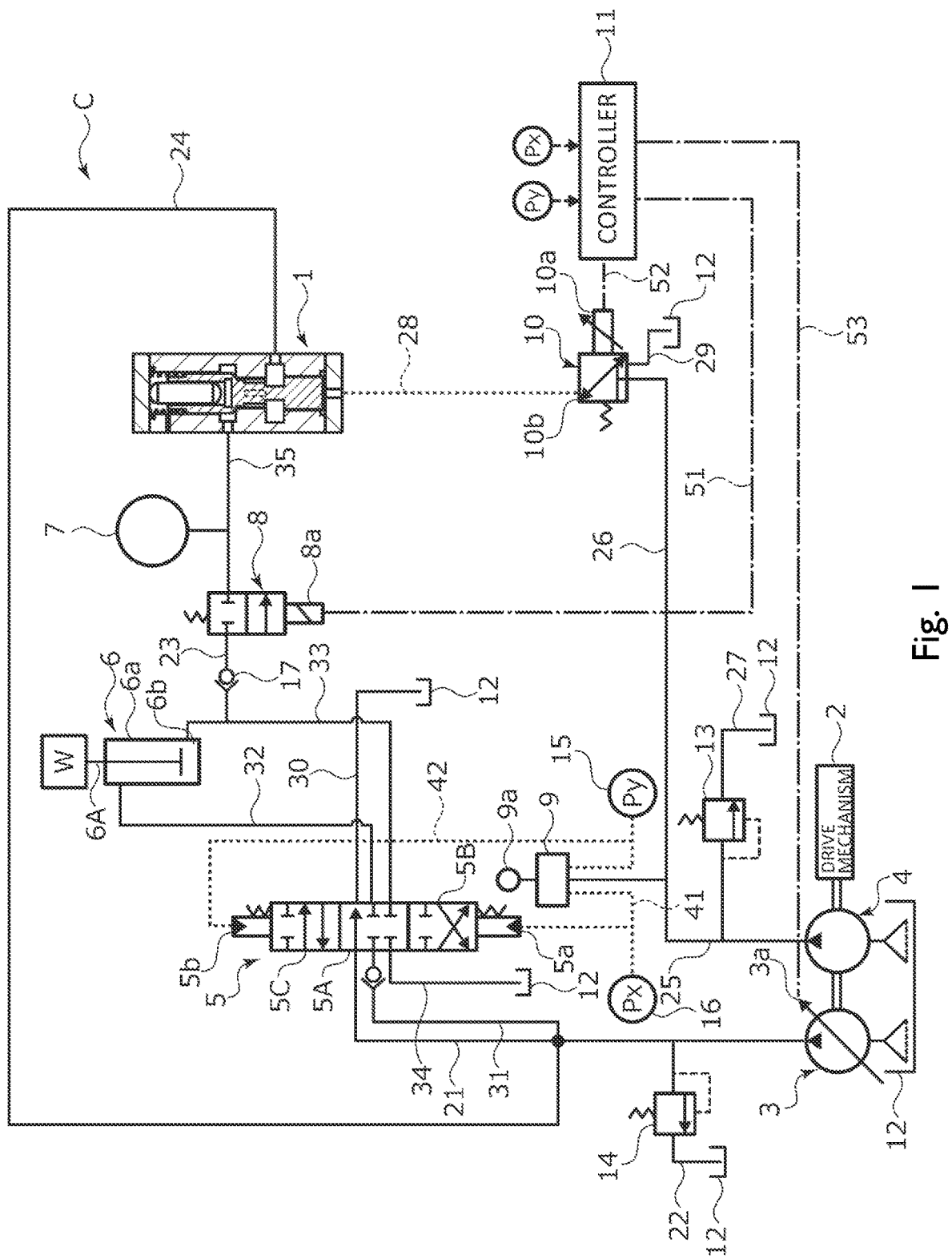
FIG. 1 is an explanatory view showing an example of a hydraulic circuit in which a fluid control device according to a first embodiment of the present invention is used.

As shown in FIG. 1, the shovel loader has a lift arm W linked with a bucket in which earth and sand, etc. is accommodated, a hydraulic cylinder 6 serving as an actuator that drives the lift arm W, and a hydraulic circuit C used for the hydraulic cylinder 6.

The hydraulic circuit C mainly includes a variable capacity type hydraulic pump 3 and a fixed capacity type hydraulic pump 4 (hereinafter, sometimes referred to as the hydraulic pumps 3, 4) to be driven by a drive mechanism 2 such as an engine and an electric motor, a direction switching valve 5 that switches supply destination of pressure oil serving as a pressure fluid supplied from the hydraulic pump 3, the hydraulic cylinder 6 connected to the direction switching valve 5, an accumulator 7 that stores part of the oil returned from the hydraulic cylinder 6 under pressure, an electromagnetic switching valve 8 that switches opened and closed states of oil passages connecting the hydraulic cylinder 6 and the accumulator 7, the spool type flow rate control valve 1 that switches opened and closed states between the accumulator 7 and an oil passage 21 on the outlet side of the hydraulic pump 3, a hydraulic remote control valve 9 that switches supply destination of the pressure oil supplied from the hydraulic pump 4, an electromagnetic proportional valve 10 that switches opened and closed states of oil passages connecting the hydraulic pump 4 and the spool type flow rate control valve 1, and a controller 11 that controls the electromagnetic proportional valve 10 and the electromagnetic switching valve 8.

The hydraulic pump 3 and the hydraulic pump 4 are coupled to the drive mechanism 2, and supply the pressure oil to the downstream side by being rotated by power from the drive mechanism 2.

The pressure oil discharged from the hydraulic pump 3 passes through the oil passage 21 and flows toward the direction switching valve 5.

The direction switching valve 5 is an open center type 6-port 3-position switching valve which is switchable between a neutral position 5A, an extension position 5B, and a contraction position 5C. Flows of the pressure oil at the respective positions of the direction switching valve 5 will be described later in detail.

A relief valve 14 is installed in the oil passage 21 on the outlet side of the hydraulic pump 3, and part of the pressure oil passes through an oil passage 22 and is discharged to a tank 12. The relief valve 14 is to prevent breakage of oil machines in the circuit, and is activated when a rod 6A in the hydraulic cylinder 6 reaches an extension end or a contraction end or when a radical load is added to the hydraulic cylinder 6, and the pressure of the oil in the circuit becomes abnormally high in a closed state.

The electromagnetic switching valve 8 is a normally closing type 2-port 2-position electromagnetic switching valve, and the electromagnetic switching valve 8 and the hydraulic cylinder 6 are connected by an oil passage 23. When an electric signal from the controller 11 passes through an electric signal line 51 and is applied to a solenoid 8a, this electromagnetic switching valve 8 brings the oil passage 23 and an oil passage 35 on the downstream side into an opened state. The accumulator 7 is connected to this oil passage 35.

The spool type flow rate control valve 1 is arranged on the downstream side of the oil passage 35, that is, on the downstream side of the accumulator 7, and the oil passage 35 and an oil passage 24 on the downstream side of the spool type flow rate control valve 1 are openable and closable. This oil passage 24 is connected to the oil passage 21 on the outlet side of the hydraulic pump 3. A structure of the spool type flow rate control valve 1 will be described later in detail.

Meanwhile, part of the pressure oil discharged from the hydraulic pump 4 passes through an oil passage 25 and is supplied to the hydraulic remote control valve 9, and part of the pressure oil passes through an oil passage 26 branching from the oil passage 25 and is supplied to the electromagnetic proportional valve 10.

The hydraulic remote control valve 9 is a variable type pressure reduction valve, and by operating a lever 9a in the extending or contracted direction, a reduced secondary pressure passes through a signal oil passage 41 or a signal oil passage 42 and is supplied to a signal port 5a or a signal port 5b of the direction switching valve 5. Among the pressure oil discharged from the hydraulic pump 4, all the extra oil not supplied to the signal ports from the hydraulic remote control valve 9 passes through a relief valve 13 and an oil passage 27 and is discharged to the tank 12.

Figure 2:
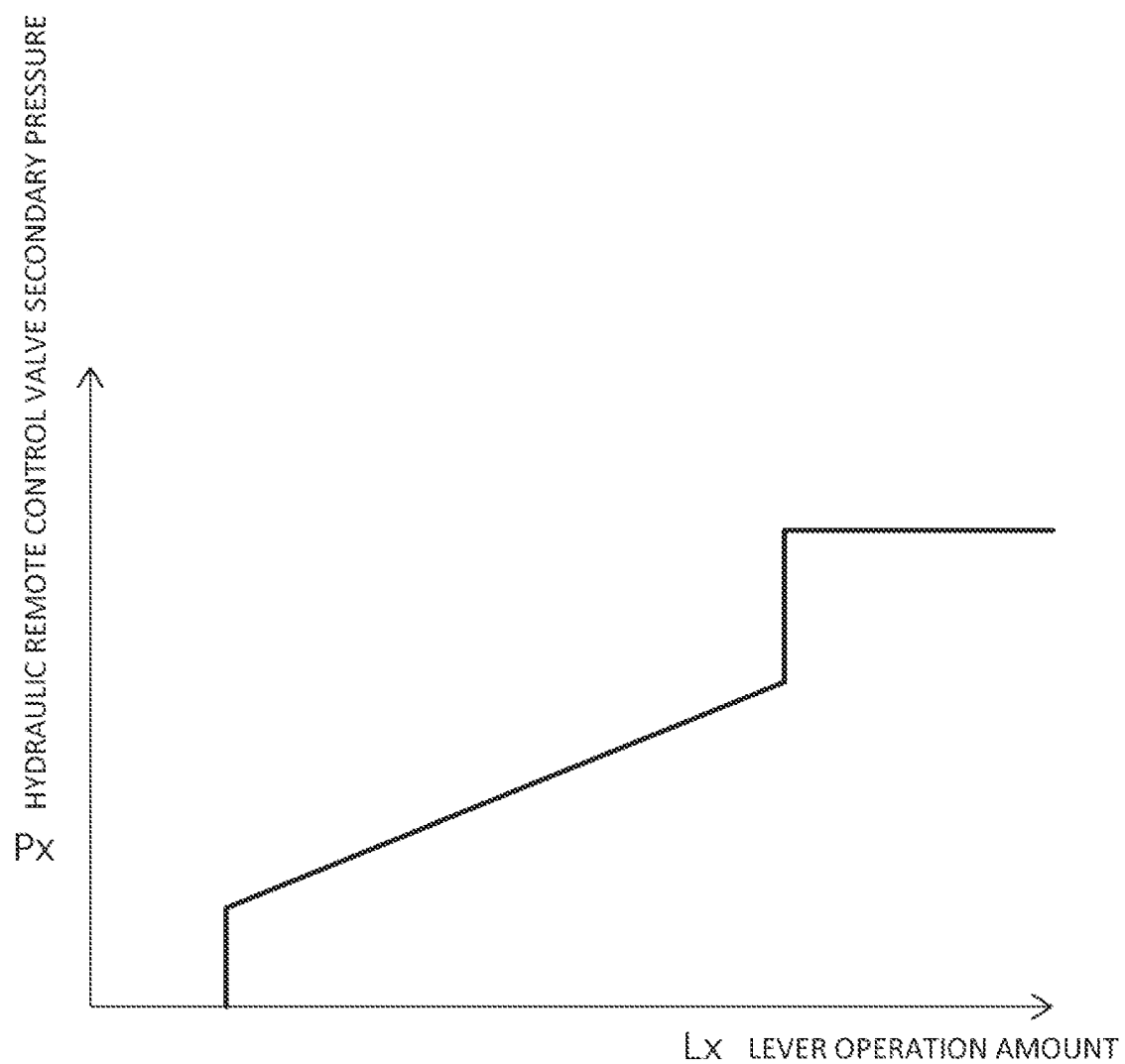
FIG. 2 is an explanatory view showing a relationship between a lever operation amount and a secondary pressure of a hydraulic remote control valve in the first embodiment.

When the lever 9a is operated in the extending or contracting direction, a secondary pressure which is proportional to a lever operation amount as shown in FIG. 2 is supplied to the signal port 5a or the signal port 5b of the direction switching valve 5. Thereby, the direction switching valve 5 is switched from the neutral position 5A to the extension position 5B or the contraction position 5C.

The electromagnetic proportional valve 10 is a normally closing type electromagnetic proportional valve. When an electric signal from the controller 11 is applied to a solenoid 10a via an electric signal line 52, a secondary pressure is outputted from an output port 10b in proportion to the electric signal, passes through an oil passage 28, and is applied to the spool type flow rate control valve 1. In a state where an electric signal is not applied, the output port 10b of the electromagnetic proportional valve 10 passes through an oil passage 29 and is conducted to the tank 12.

Next, a mode in which the lever 9a of the hydraulic remote control valve 9 is actually operated will be described.

When the lever 9a of the hydraulic remote control valve 9 is not operated, the direction switching valve 5 is placed at the neutral position 5A. At this neutral position 5A, all the pressure oil discharged from the hydraulic pump 3 passes through the oil passage 21, the direction switching valve 5, and an oil passage 30 and flows to the tank 12.

When the lever 9a is operated in the contracting direction, the direction switching valve 5 is switched to the contraction position 5C. At this contraction position 5C, the pressure oil passes through an oil passage 31 branching from the oil passage 21, the direction switching valve 5, and an oil passage 32 and flows into an oil chamber 6a of the hydraulic cylinder 6, and the oil in an oil chamber 6b passes through an oil passage 33, the direction switching valve 5, and an oil passage 34 and is discharged to the tank 12. Thereby, the rod 6A of the hydraulic cylinder 6 is activated in the contracting direction.

When an electric signal from a pressure sensor 15 installed on the signal oil passage 42 is inputted to the controller 11 and by an arithmetic circuit mounted in the controller 11 in advance, the electric signal passes through the electric signal line 51 and is inputted to the electromagnetic switching valve 8, the electromagnetic switching valve 8 is switched to an opened state, and part of the oil returned from the oil chamber 6b of the hydraulic cylinder 6 passes through the oil passage 23, a check valve 17, the electromagnetic switching valve 8, and the oil passage 35 and is stored under pressure in the accumulator 7.

Meanwhile, when the lever 9a is operated in the extending direction, the direction switching valve 5 is switched to the extension position 5B. At this extension position 5B, the pressure oil passes through the oil passage 31, the direction switching valve 5, and the oil passage 33 and flows into the oil chamber 6b of the hydraulic cylinder 6, and the oil in the oil chamber 6a passes through the oil passage 32, the direction switching valve 5, and the oil passage 34 and is discharged to the tank 12. Thereby, the rod 6A of the hydraulic cylinder 6 is activated in the extending direction.

When an electric signal from a pressure sensor 16 installed on the signal oil passage 41 is inputted to the controller 11, and by the arithmetic circuit mounted in the controller 11 in advance, the electric signal passes through the electric signal line 52 and is inputted to the electromagnetic proportional valve 10, the secondary pressure passes through the oil passage 28 and is applied to the spool type flow rate control valve 1 and the spool type flow rate control valve 1 is brought into an opened state. Thereby, the oil stored under pressure in the accumulator 7 passes through the spool type flow rate control valve 1 and the oil passage 24, joins the oil passage 21, and is regenerated in the oil chamber 6b of the hydraulic cylinder 6.

At this time, by the controller 11, the electric signal passes through an electric signal line 53 and is inputted to a discharge oil amount control portion 3a of the hydraulic pump 3, and a pump discharge amount is reduced.

In such a way, with the hydraulic circuit C of the pressure oil in which the accumulator 7 is used, by regenerating the oil stored under pressure in the accumulator 7, it is possible to obtain sufficient extension speed of the hydraulic cylinder 6 while reducing a discharge oil amount of the hydraulic pump 3. Thus, it is possible to save energy for the shovel loader.

Next, the structure of the spool type flow rate control valve 1 will be described based on FIGS. 3 and 4. With FIG. 3, a valve closed state of the spool type flow rate control valve 1 which is a state where a spool 102 does not receive the pressure oil, that is, drive force from the hydraulic pump 4 will be described.

Figure 3:
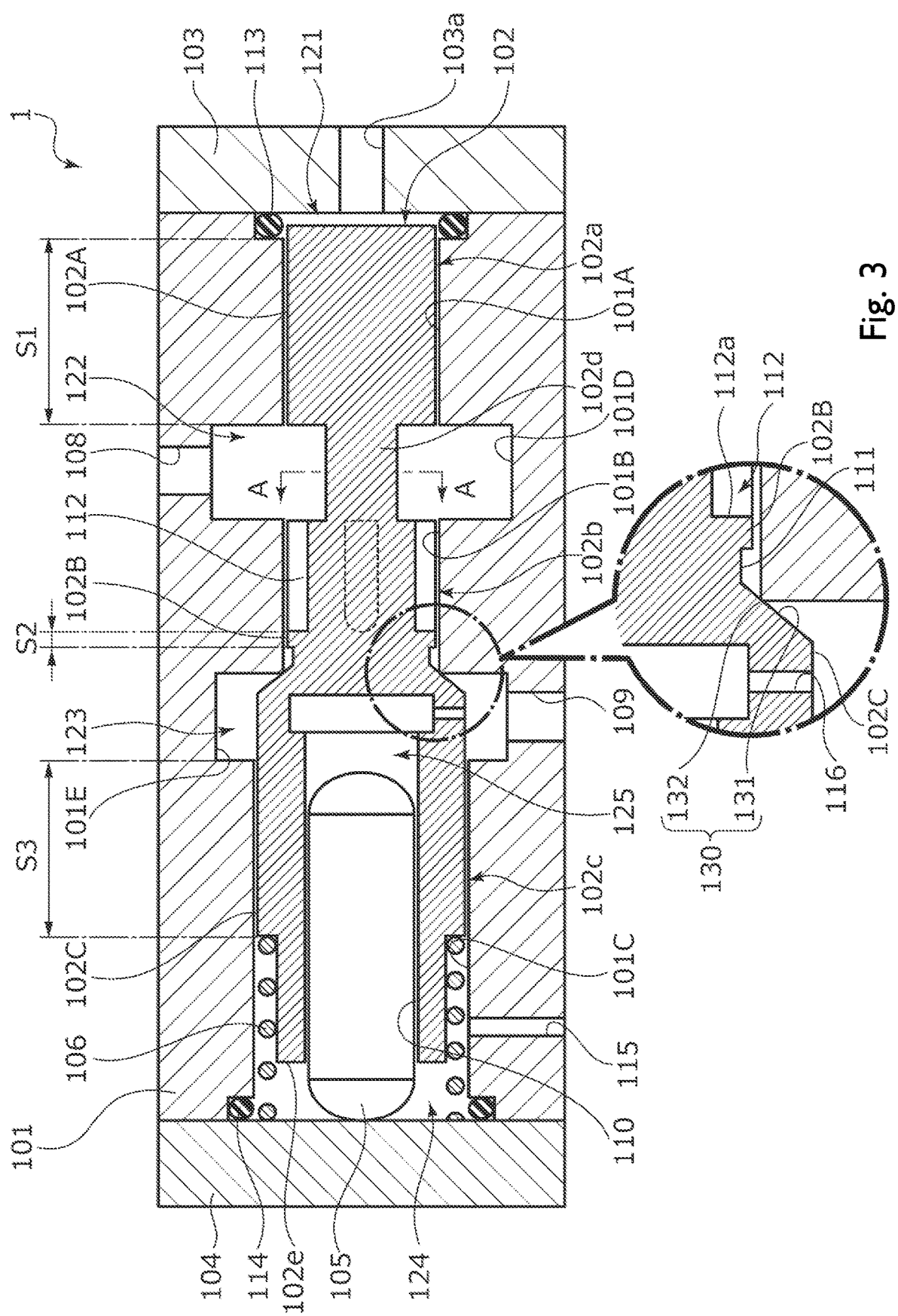
FIG. 3 is a sectional view showing a valve closed state of the fluid control device in the first embodiment.

As shown in FIG. 3, the spool type flow rate control valve 1 mainly includes a tubular housing 101, the spool 102 inserted into the housing 101, port sealing bodies 103, 104 that close openings on both the sides of the housing 101, a pressure receiving body 105 relatively slidably arranged in the spool 102, and a spring 106 serving as a biasing member which is arranged between the spool 102 and the port sealing body 104.

In the housing 101, in order from the port sealing body 103 to the port sealing body 104, a first radially inner land portion 101A extending on the radially inner side, a second radially inner land portion 101B serving as a housing land portion, and a third radially inner land portion 101C are provided separately from each other.

In other words, large diameter portions 101D, 101E having larger diameters than the radially inner land portions are formed respectively between the first radially inner land portion 101A and the second radially inner land portion 101B, and between the second radially inner land portion 101B and the third radially inner land portion 101C.

Inner diameters of the first radially inner land portion 101A and the second radially inner land portion 101B are the same diameters as each other. An inner diameter of the third radially inner land portion 101C is formed to be larger than the inner diameters of the first radially inner land portion 101A and the second radially inner land portion 101B.

In the housing 101, a borehole 108 providing communication between an internal space and an external space of the large diameter portion 101D in the radial direction, a borehole 109 providing communication between an internal space and an external space of the large diameter portion 101E in the radial direction, and a borehole 115 providing communication between an internal space and an external space of the third radially inner land portion 101C in the radial direction in the vicinity of the port sealing body 104 are formed.

The borehole 108 communicates with the oil passage 24 for regeneration (see FIG. 1). That is, the borehole 108 is an output port through which the oil stored under pressure in the accumulator 7 is outputted from the internal space of the large diameter portion 101D to the oil passage 24.

The borehole 109 communicates with the oil passage 35 and the accumulator 7 (see FIG. 1). That is, the borehole 109 is an input port through which the oil stored under pressure in the accumulator 7 is inputted to the internal space of the large diameter portion 101E.

The borehole 115 communicates with an oil passage (not shown) communicating with the tank 12.

In the spool 102, in order from the port sealing body 103 to the port sealing body 104, a first radially outer land portion 102A, a second radially outer land portion 102B, and a third radially outer land portion 102C are provided separately from each other.

The first radially inner land portion 101A and the first radially outer land portion 102A that slides with respect to this form a first sliding portion 102a.

The second radially inner land portion 101B and the second radially outer land portion 102B serving as a spool land portion that slides with respect to this form a second sliding portion 102b. A plurality of notches 112 extending in the axial direction are formed in the second radially outer land portion 102B.

Figure 4:
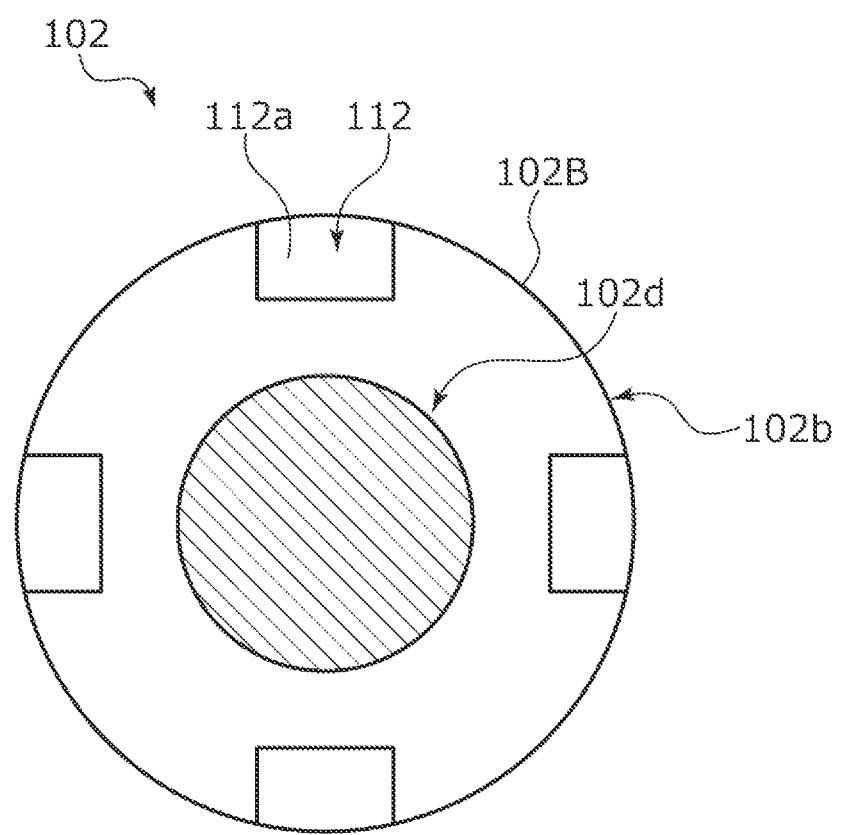
FIG. 4 is a sectional view by line A-A. Only a spool is taken out and shown in the figure in the first embodiment.

With reference to FIG. 4, each of the notches 112 is open on the side of the first sliding portion 102a, and is provided with a wall portion 112a extending in an outer diameter to the side of a third sliding portion 102c. In FIG. 4, only the spool 102 is taken out and shown.

Back to FIG. 3, the third radially inner land portion 101C and the third radially outer land portion 102C serving as a large diameter portion that slides with respect to this form the third sliding portion 102c.

The first sliding portion 102a and the second sliding portion 102b are separated from each other in the axial direction, and coupled by a small diameter portion 102d (see FIG. 4) having a smaller diameter than the first sliding portion 102a and the second sliding portion 102b. The third sliding portion 102c is formed to have a larger diameter than the first sliding portion 102a and the second sliding portion 102b.

Specifically, a taper-shaped large diameter portion 131 is formed between the second radially outer land portion 102B and the third radially outer land portion 102C.

Between the large diameter portion 131 and the second radially outer land portion 102B, a twisted portion 111 having a smaller diameter than the second radially outer land portion 102B is formed over the circumferential direction. That is, part of the large diameter portion 131 extends on the radially inner side of the second radially outer land portion 102B.

In a valve closed state of the spool type flow rate control valve 1, the large diameter portion 131 is abutted with an opening edge 132 on the side of the large diameter portion 101E in the second radially inner land portion 101B in a sealed manner. That is, the large diameter portion 131 and the opening edge 132 form a poppet valve 130.

Inside the third sliding portion 102c, a recessed portion 110 which is open in a space on the side of the port sealing body 104 is provided. In the third sliding portion 102c, a borehole 116 serving as a communication hole which provides communication between an internal space of the recessed portion 110 and the internal space of the large diameter portion 101E in the radial direction is formed. Details of a shape of the recessed portion 110 will be described later.

In the recessed portion 110, the pressure receiving body 105 which is a separate body from the housing 101 and the port sealing body 104 is relatively slidably arranged. Both end portions of this pressure receiving body 105 are formed in a semispherical shape.

The port sealing bodies 103, 104 are respectively fixed to both ends of the housing 101 by fastening members such as bolts (not shown). Between the port sealing bodies 103, 104 and the housing 101, seal members 113, 114 are arranged, and portions between the port sealing bodies 103, 104 and the housing 101 are sealed.

In the port sealing body 103, a borehole 103a passing through in the axial direction is formed, and the borehole 103a communicates with the oil passage 28 (see FIG. 1).

Hereinafter, in the housing 101, a space sandwiched between the port sealing body 103 and the first sliding portion 102a will be called an oil chamber 121, a space sandwiched between the first sliding portion 102a and the second sliding portion 102b will be called an oil chamber 122 serving as an output chamber, a space sandwiched between the second sliding portion 102b and the third sliding portion 102c will be called an oil chamber 123 serving as an input chamber, and a space sandwiched between the third sliding portion 102c, the pressure receiving body 105, and the port sealing body 104 will be called an oil chamber 124.

A space in the recessed portion 110 partitioned from the oil chamber 124 by the pressure receiving body 105 will be called an oil chamber 125. The oil chamber 123 and the oil chamber 125 communicate with each other through the borehole 116.

As shown in FIG. 3, in a valve closed state of the spool type flow rate control valve 1, the oil chamber 121 and the oil chamber 122 are partitioned from each other in a sealed manner by the first sliding portion 102a of the spool 102, and the oil chamber 123 and the oil chamber 124 are partitioned from each other in a sealed manner by the third sliding portion 102c.

Specifically, a gap between the first radially inner land portion 101A and the first radially outer land portion 102A, and a gap between the third radially inner land portion 101C and the third radially outer land portion 102C are small. Further, a size S1 of a portion where the first radially inner land portion 101A and the first radially outer land portion 102A overlap with each other in the axial direction, and a size S3 of a portion where the third radially inner land portion 101C and the third radially outer land portion 102C overlap with each other in the axial direction are ensured to be sufficiently long. Thus, there is almost no oil leakage from the gap between the first radially inner land portion 101A and the first radially outer land portion 102A and the gap between the third radially inner land portion 101C and the third radially outer land portion 102C. The sizes S1, S3 may be the same size or may be different sizes.

An oil leakage amount is changed due to a diameter of the land portion on the side of the housing 101, an annular area of a gap between the land portion on the side of the housing 101 and the land portion on the side of the spool 102, a size of overlap in the axial direction between the land portion on the side of the housing 101 and the land portion on the side of the spool 102, a pressure difference between the adjacent oil chambers, etc.

In a valve closed state of the spool type flow rate control valve 1, the borehole 103a, the borehole 108, and the borehole 115 are conducted to the tank 12 (see FIG. 1). Thus, the oil chamber 121, the oil chamber 122, and the oil chamber 124 have the same pressure.

In a valve closed state of the spool type flow rate control valve 1, the oil chamber 122 and the oil chamber 123 are partitioned from each other in a sealed manner by a spool valve including the second radially inner land portion 101B and the second radially outer land portion 102B and the poppet valve 130 including the large diameter portion 131 and the opening edge 132.

Specifically, a gap between the second radially inner land portion 101B and the second radially outer land portion 102B is small, and the gap is closed by the poppet valve 130 including the large diameter portion 131 and the opening edge 132. Thus, there is no oil leakage from the gap between the second radially inner land portion 101B and the second radially outer land portion 102B.

In such a way, it is possible to reliably seal a portion between the oil chamber 122 and the oil chamber 123 by closing of the two valves. Thus, it is possible to form the second radially outer land portion 102B which is short in the axial direction.

Specifically, it is possible to make a size S2 of a portion where the second radially inner land portion 101B and a portion from the wall portion 112a of the notch 112 to the twisted portion 111 in the second radially outer land portion 102B overlap with each other in the axial direction (that is, seen in the radial direction) sufficiently shorter than the sizes S1, S3 (S1, S3>S2).

Since the borehole 109 is conducted to the accumulator 7 (see FIG. 1), the pressure of the oil chamber 123 is higher than the pressure of the oil chamber 121, the oil chamber 122, the oil chamber 124. As described above, the oil chamber 123 and the oil chamber 125 communicate with each other through the borehole 116. Thus, the oil chamber 123 and the oil chamber 125 have the same pressure.

Since the pressure of the oil chamber 125 is higher than the pressure of the oil chamber 124, the pressure receiving body 105 is pressed onto the port sealing body 104 by the pressure of the oil chamber 125.

Forces applied to the spool 102 in a valve closed state of the spool type flow rate control valve 1 will be described based on FIG. 5.

Figure 5:
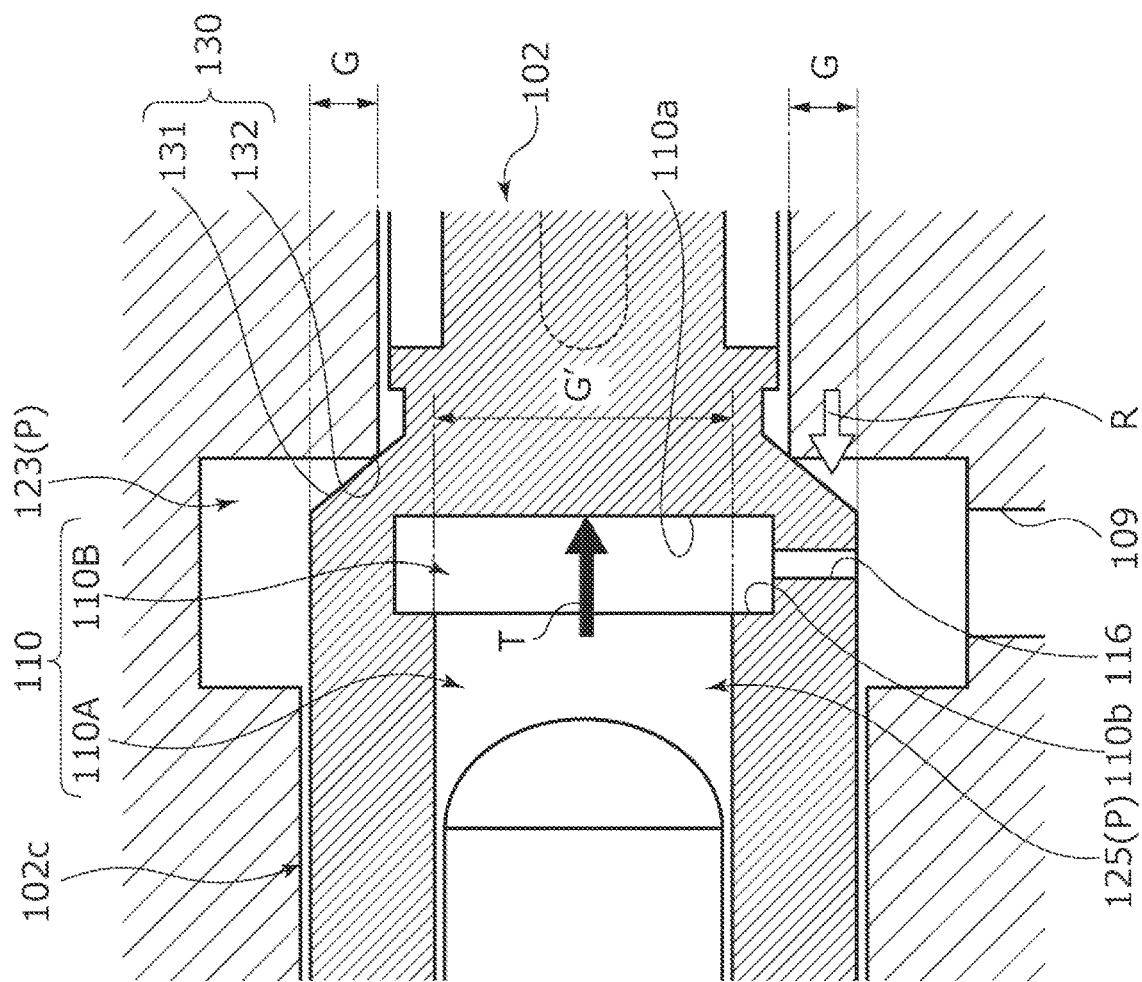
FIG. 5 is an explanatory view showing a relationship between forces in the valve closing direction and the valve opening direction acting on the spool in the first embodiment.

As shown in FIG. 5, a force R in the valve opening direction acts on the spool 102.

In detail, when the pressure in the oil chamber 123 is a pressure P, the pressure P is applied to an axial area G of a radially outer part of the large diameter portion 131 with respect to a part in contact with the opening edge 132, that is, a cosine area of an annular inclined surface between the part of the large diameter portion 131 in contact with the opening edge 132 and the third radially outer land portion 102C. The force R in the valve opening direction acting on the spool 102 is R=P×G. Hereinafter, the axial area G of the radially outer part may be sometimes called the axially-seen area G of the radially outer part.

Meanwhile, a force T in the valve closing direction acts on the spool 102.

The force T will be described in detail. The recessed portion 110 has a small diameter recessed portion 110A having an opening portion which is open in the oil chamber 124 (see FIG. 3), and a large diameter recessed portion 110B having a larger diameter than the small diameter recessed portion 110A and having an end surface 110a. The end surface 110a has a pressure receiving portion G' serving as a pressure receiving surface to which the pressure P in the oil chamber 125 is applied.

The pressure P in the oil chamber 125 is applied to the entire end surface 110a. A radially outer portion of the end surface 110a with respect to the small diameter recessed portion 110A and an annular surface 110b forming a step portion with the small diameter recessed portion 110A and the large diameter recessed portion 110B oppose each other in the axial direction and have the same area. The forces in the valve closing direction and the valve opening direction by the pressure P cancel each other at these opposing points. Thus, a portion of the end surface 110a on which the force in the valve closing direction substantially acts, that is, a region of the end surface 110a obtained by excluding the radially outer portion with respect to the small diameter recessed portion 110A is the pressure receiving portion G'.

That is, the pressure P in the oil chamber 125 is applied to the pressure receiving portion G', and the force T in the valve closing direction acting on the spool 102 is T=P×G'.

Now, in the spool 102, the axially-seen area G of the radially outer part and the pressure receiving portion G' have the same area (G=G'). From the description above, the force R in the valve opening direction and the force T in the valve closing direction acting on the spool 102 are the same as each other (R=T), and these forces R and T cancel each other and are balanced.

Next, a valve opened state of the spool type flow rate control valve 1 will be described based on FIGS. 6 and 7.

Figure 6:
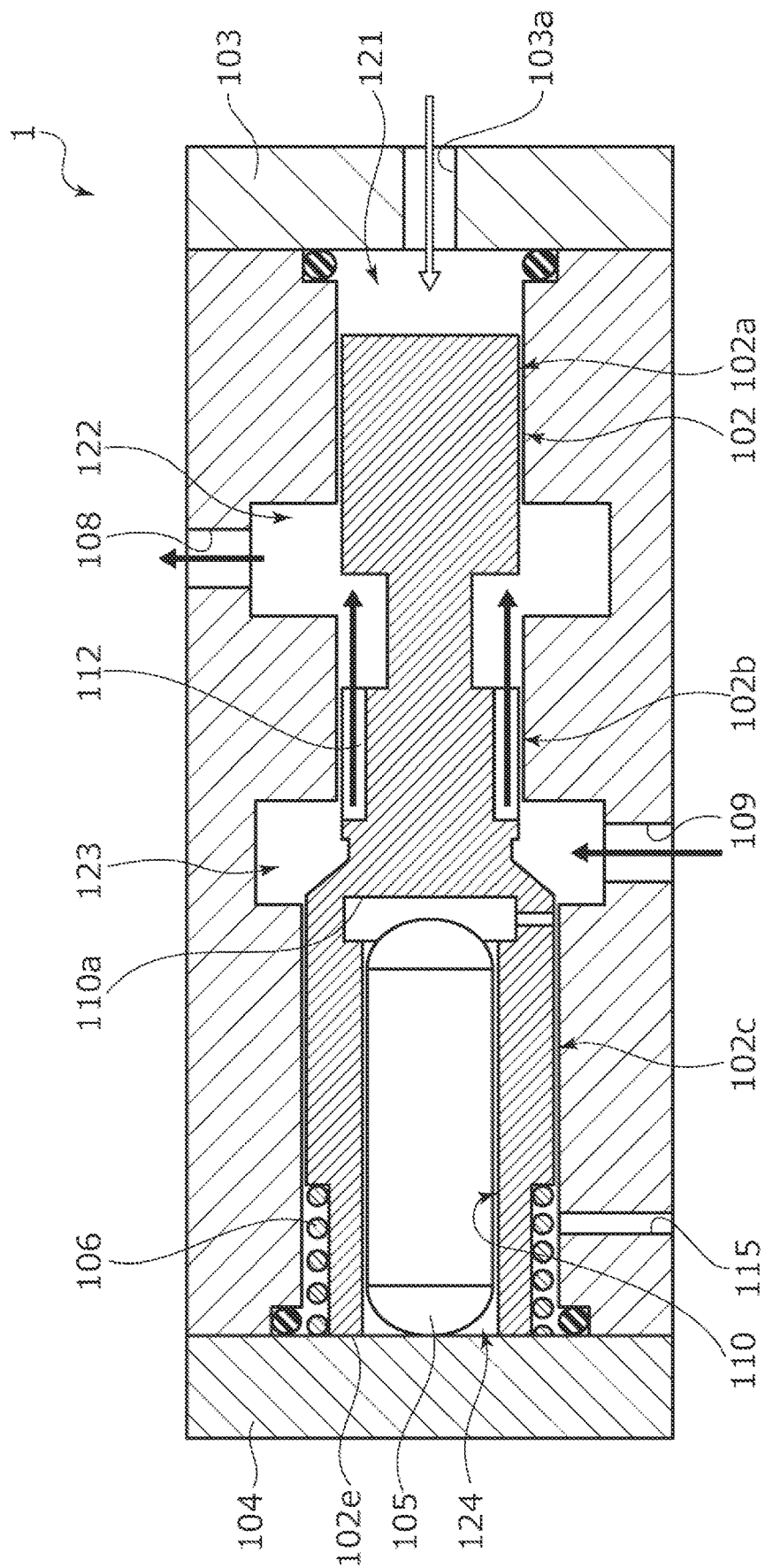
FIG. 6 is a sectional view showing a valve opened state of the fluid control device in the first embodiment.

As shown in FIG. 6, when the pressure oil passes through the borehole 103a of the port sealing body 103 and is supplied from the hydraulic pump 4 into the oil chamber 121 (see a white arrow of FIG. 6), the spool 102 is moved in the valve opening direction against bias force of the spring 106 by a hydraulic pressure thereof until an end portion 102e of the spool 102 is abutted with an end surface of the port sealing body 104.

When the spool 102 is moved from a valve closing position to a valve opening position, the oil chamber 122 and the oil chamber 123 communicate with each other through the plurality of notches 112 provided on an outer peripheral surface of the second sliding portion 102b. Even when the spool 102 is moved to the valve opening position, the oil chamber 121 and the oil chamber 122 are partitioned from each other in a sealed manner by the first sliding portion 102a, and the oil chamber 123 and the oil chamber 124 are partitioned from each other in a sealed manner by the third sliding portion 102c.

When the oil chamber 122 and the oil chamber 123 communicate with each other, the oil stored under pressure and supplied from the accumulator 7 into the oil chamber 123 through the borehole 109 passes through the notches 112, flows into the oil chamber 122, and flows out from the oil chamber 122 to the downstream side through the borehole 108 (see black arrows of FIG. 6).

At this time, the oil in the oil chamber 124 is discharged to the tank 12 through the borehole 115 (see FIG. 1).

Figure 7:
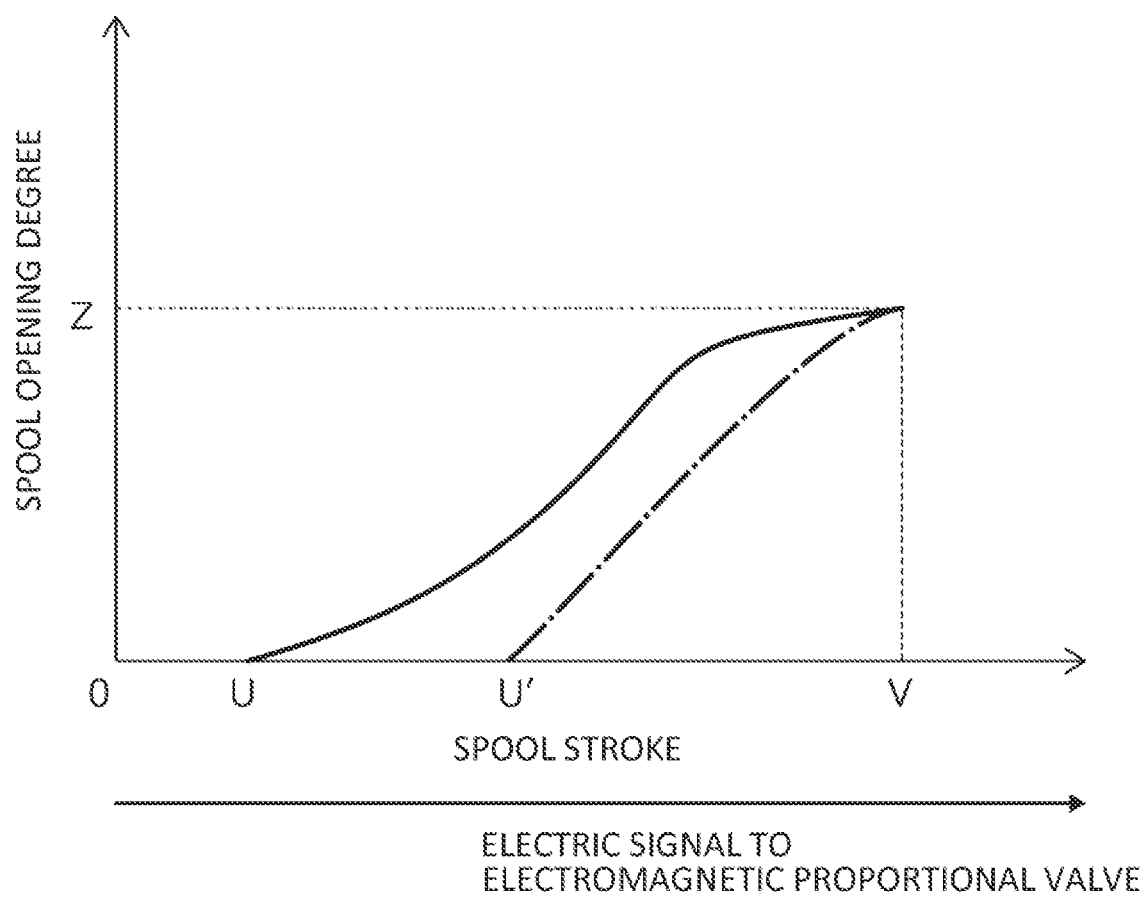
FIG. 7 is an explanatory view showing a relationship between a spool stroke and a spool opening degree of the fluid control device in the first embodiment.

FIG. 7 shows a relationship between a stroke of the spool 102 and an opening degree of the notches 112 (also called as a spool opening degree). In FIG. 7, a mode of the spool type flow rate control valve 1 of the present embodiment is shown by a solid line, and a mode of a spool type flow rate control valve having no poppet valve is shown by a broken line.

The horizontal axis of FIG. 7 indicates the stroke of the spool 102, and the vertical axis indicates the opening degree of the notches 112. With the spool type flow rate control valve 1 (solid line), from a stroke zero to a stroke U, the notches 112 are closed with zero opening degree. The notches 112 start opening at the stroke U, and have a maximum value Z at a stroke V. A section from the stroke zero to the stroke U indicates strokes before the wall portions 112a of the notches 112 reach the opening edge 132 of the second radially inner land portion 101B (see FIG. 3).

Meanwhile, with the spool type flow rate control valve having no poppet valve (broken line), in order to prevent oil leakage from a portion between a housing land portion and a spool land portion, there is a need for ensuring a long size of a portion where the housing land portion and the spool land portion overlap with each other in the axial direction. In this case, a section from a stroke zero to a stroke U' at which opening is started becomes long, and control responsiveness is deteriorated. Further, there is a problem that a section from the stroke U' to a stroke V, that is, a control area of a flow rate control curve is narrowed down and a control property is deteriorated.

That is, with the spool type flow rate control valve 1 (solid line), it is possible to finely control the spool opening degree. That is, a freedom degree of the flow rate control curve is high. This is because, in comparison to the spool type flow rate control valve having no poppet valve (broken line), it is possible to shorten the section from the stroke zero to the stroke U, and thus, control responsiveness is favorable and it is possible to ensure a wide section from the stroke U to the stroke V.

As described above, in a valve closed state of the spool type flow rate control valve 1, it is possible to reliably seal the portion between the oil chamber 122 and the oil chamber 123 by the poppet valve 130 including the large diameter portion 131 and the opening edge 132 in addition to closing of the spool valve by the second radially inner land portion 101B and the second radially outer land portion 102B. Thus, it is possible to form the second radially outer land portion 102B which is short in the axial direction. Thereby, when the spool type flow rate control valve 1 is in a valve opened state, the oil chamber 122 and the oil chamber 123 communicate with each other quickly. Thus, it is possible to improve control responsiveness.

By the twisted portion 111 formed between the large diameter portion 131 and the second radially outer land portion 102B, the twisted portion having a small diameter, since the taper-shaped large diameter portion 131 extends on the radially inner side of the second radially outer land portion 102B, it is possible to reliably seat the large diameter portion 131 at the opening edge 132 of the second radially inner land portion 101B.

Further, since special processing such as formation of a taper-shaped opening edge 132 is not required, manufacturing of the housing 101 is simple and easy.

The spool 102 is provided with the axially-seen area G of the radially outer part of the large diameter portion 131 to which the pressure in the oil chamber 123 is applied, and the pressure receiving portion G' having the same area as the area G, the pressure receiving portion to which the pressure in the oil chamber 125 is applied, and the force R in the valve opening direction and the force T in the valve closing direction generated by applying the pressures to the axially-seen area G of the radially outer part and the pressure receiving portion G' cancel each other and are balanced.

According to this, it is possible to precisely perform opening/closing control of the oil chamber 122 and the oil chamber 123 by the spool 102.

The pressure receiving body 105 is arranged in the recessed portion 110 of the spool 102, the oil chamber 125 is partitioned by the recessed portion 110 and the pressure receiving body 105, and the oil chamber 123 and the oil chamber 125 communicate with each other through the borehole 116. Further, the pressure receiving portion G' having the same area as the axially-seen area G of the radially outer part is provided on the end surface 110a of the recessed portion 110. According to this, it is possible to make the oil chamber 123 and the oil chamber 125 have the same pressure, and the pressures of the oil chamber 123 and the oil chamber 125 are applied to the axially-seen area G of the radially outer part and the pressure receiving portion G' which have the same area. Thus, it is possible to reliably, simply, and easily balance the force R in the valve opening direction and the force T in the valve closing direction of the spool 102.

The pressure receiving body 105 is a separate body from the housing 101 and the port sealing body 104. Thus, high precision is not required at the time of assembling the spool type flow rate control valve 1, and an assembling task becomes simple and easy.

The third radially outer land portion 102C having the same diameter as an outer diameter of the large diameter portion 131 slides with respect to the third radially inner land portion 101C, and in addition, the recessed portion 110 and the pressure receiving body 105 slide with respect to each other. Thus, it is possible to prevent the spool 102 from being inclined when the spool 102 is moved in the axial direction, and it is possible to stably move the spool 102 in the axial direction.

The third radially outer land portion 102C extends in the axial direction from the outer diameter of the large diameter portion 131. Thus, at the time of assembling the spool type flow rate control valve 1, it is possible to insert and arrange the spool 102 from an opening on the side of the port sealing body 104 of the housing 101, and the assembling task is simple and easy. In addition, since it is possible to form the housing 101 by a single member, manufacturing and assembling of the housing 101 are also simple and easy.

In detail, when part of a spool valve is simply a poppet structure, a housing has to be divided into plural parts at a position of a poppet portion having a large diameter. Thus, the number of processing is increased and a structure becomes complicated. For example, in a case where the housing is divided into plural parts, there is a need for aligning the axes of the two divided housings, and processing becomes difficult. However, as in the present structure, by providing the third radially outer land portion 102C so as to extend in the axial direction from the outer diameter of the large diameter portion 131, it is possible to form the single housing 101, and manufacturing and processing become simple and easy.

The first embodiment exemplifies the mode in which the radially outer part and the pressure receiving surface have the same area, and the forces applied onto both the sides of the spool in the axial direction are balanced by making the pressure of the same fluid act on the radially outer part and the pressure receiving surface. However, the present invention is not limited to this but the forces applied onto both the sides of the spool in the axial direction may be balanced by making fluids having different pressures act on the radially outer part and the pressure receiving surface. That is, the radially outer part and the pressure receiving surface may have areas of different sizes from each other.

The first embodiment exemplifies the mode in which the pressure receiving portion G' serving as the pressure receiving surface is provided on the end surface 110a of the recessed portion 110. However, the present invention is not limited to this but it is possible to make a change freely as long as the pressure receiving surface opposes the radially outer part of the large diameter portion in the axial direction and the pressure of the fluid is applied in the valve closing direction.

The first embodiment exemplifies the mode in which the pressure receiving body 105 is a separate body from the housing 101 and the port sealing body 104. However, the present invention is not limited to this but, for example, the pressure receiving body 105 may be a part integrally extending from the housing 101 or the port sealing body 104.

Second Embodiment

Next, a fluid control device according to a second embodiment of the present invention will be described with reference to FIG. 8. Description of overlapping configurations which are the same as the configurations of the first embodiment will be omitted.

Figure 8:
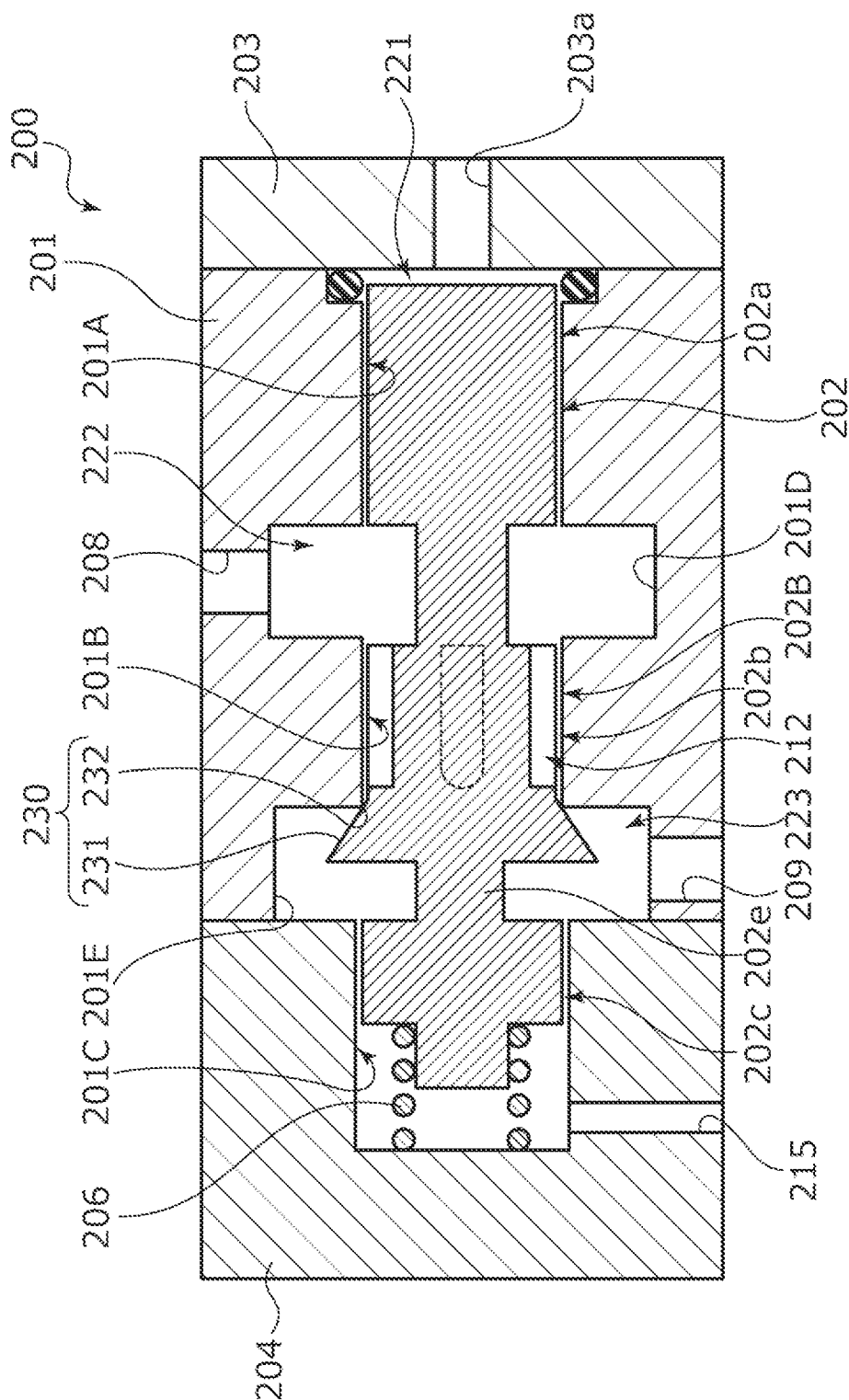
FIG. 8 is a sectional view showing a fluid control device according to a second embodiment of the present invention.

As shown in FIG. 8, a spool type flow rate control valve 200 mainly includes a housing 201, a spool 202, port sealing bodies 203, 204, and a spring 206.

In the housing 201, a first radially inner land portion 201A, and a second radially inner land portion 201B serving as a housing land portion are provided separately from each other. A large diameter portion 201D is formed between the first radially inner land portion 201A and the second radially inner land portion 201B. On the side of the port sealing body 204 of the second radially inner land portion 201B, a large diameter recessed portion 201E which is open toward the port sealing body 204 is formed. In the housing 201, a borehole 208 communicating with an oil passage 24 for regeneration (see FIG. 1), and a borehole 209 communicating with an accumulator 7 are provided.

The port sealing body 204 has a U-shaped section, and an inner peripheral surface of a recessed portion which is open on the side of the housing 201 is a third radially inner land portion 201C. This third radially inner land portion 201C is formed to have the same diameter as the first radially inner land portion 201A and the second radially inner land portion 201B. A borehole 215 communicating with a tank 12 (see FIG. 1) is formed in the port sealing body 204.

In the spool 202, a first sliding portion 202a, a second sliding portion 202b, and a third sliding portion 202c are provided. The first sliding portion 202a, the second sliding portion 202b, and the third sliding portion 202c have the same diameter.

On the side of the port sealing body 204 in the second sliding portion 202b, a large diameter portion 231 is formed. The large diameter portion 231 is separated from the third sliding portion 202c in the axial direction, and the large diameter portion 231 and the third sliding portion 202c are coupled by a small diameter portion 202e having a smaller diameter than the third sliding portion 202c.

The large diameter portion 231 and an opening edge 232 form a poppet valve 230.

When pressure oil passes through a borehole 203a and is supplied from a hydraulic pump 4 (see FIG. 1) into an oil chamber 221, the spool 202 is moved in the valve opening direction against bias force of the spring 206 until an end portion of the third sliding portion 202c is abutted with an end portion of the port sealing body 204. In this state, an oil chamber 222 and an oil chamber 223 communicate with each other through notches 212.

In such a way, in a valve closed state of the spool type flow rate control valve 1, it is possible to reliably seal a portion between the oil chamber 222 and the oil chamber 223 by the poppet valve 230 by the large diameter portion 231 and the opening edge 232 in addition to closing of a spool valve by the second radially inner land portion 201B and a second radially outer land portion 202B. Thus, it is possible to form the second radially outer land portion 202B which is short in the axial direction.

The embodiments of the present invention are described above with the drawings. However, specific configurations are not limited to these embodiments, and the present invention includes changes and additions within the range not departing from the scope of the present invention.

For example, the above embodiments describe the hydraulic circuit in which part of the returned oil is stored under pressure in the accumulator when the hydraulic cylinder is contracted and the oil stored under pressure is regenerated when the hydraulic cylinder is extended. However, for example, the oil may be stored under pressure in the accumulator when the hydraulic cylinder is extended, and the oil stored under pressure may be regenerated when the hydraulic cylinder is contracted. Part of the returned oil generated at the time of driving another actuator may be stored under pressure in the accumulator and the oil stored under pressure may be regenerated in the hydraulic cylinder. That is, it is applicable to various fluid circuits that perform storage under pressure and regeneration utilizing an accumulator.

The fluid control device is not limited to a fluid control device used for a hydraulic circuit of a shovel loader but may be applied to a fluid circuit for a vehicle, a construction machine, an industrial machine, etc. which is other than the shovel loader. The pressure fluid used in the fluid circuit may be a liquid or a gas which is other than the oil.

The above embodiments of the fluid control device exemplify the mode in which a valve closed state and a valve opened state are switched by pilot oil pressures from the hydraulic pumps. However, the present invention is not limited to this but a spool type solenoid valve may be used.

REFERENCE SIGNS LIST

1 Spool type flow rate control valve (fluid control device)
3, 4 Hydraulic pump
5 Direction switching valve
6 Hydraulic cylinder (actuator)
7 Accumulator
21 to 35 Oil passage
101 Housing
101B Second radially inner land portion (housing land portion)
102 Spool
102B Second radially outer land portion (spool land portion)
102C Third radially outer land portion (large diameter portion)
103, 104 Port sealing body
105 Pressure receiving body
106 Spring (biasing member)
110 Recessed portion
111 Twisted portion
112 Notch
116 Borehole (communication hole)

122 Oil chamber (output chamber)
123 Oil chamber (input chamber)
125 Oil chamber (space in recessed portion)
130 Poppet valve
131 Large diameter portion
132 Opening edge
200 Spool type flow rate control valve (fluid control device)
230 Poppet valve
231 Large diameter portion
232 Opening edge
C Hydraulic circuit
G Axially-seen area of radially outer part
G' Pressure receiving portion (pressure receiving surface)

The invention claimed is:

1. A fluid control device of normally closed type comprising:
a housing partitioned into an input chamber and an output chamber by a housing land portion extending on a radially inner side of the housing;
a spool arranged inside the housing and provided with a spool land portion that is configured to reciprocatively slide with respect to the housing land portion and that extends on a radially outer side of the spool; and
a biasing member configured to bias the spool toward a valve closing position of the spool, wherein
upon receiving drive force from an exterior, the spool is moved against bias force of the biasing member, and the input chamber and the output chamber communicate with each other,
the spool includes a large diameter portion arranged in the input chamber and having a larger diameter than the spool land portion,
the large diameter portion and the housing land portion form a poppet valve structure,
the large diameter portion is formed in a taper shape abutted with an opening edge of the housing land portion,
a twisted portion having a smaller diameter than the spool land portion is formed between the large diameter portion and the spool land portion
the spool has a pressure receiving surface having an area equal to an area of an axial projection plane of a radially outer part of the large diameter portion with respect to an opening edge of the housing land portion, and
the pressure receiving surface receives a force of fluid in a closing direction of the spool balanced with a force in an opening direction of the spool which is generated by the fluid of the input chamber which acts on the radially outer part.

2. The fluid control device according to claim 1, wherein
a recessed portion communicating with a space of the input chamber on a side opposite to the housing land portion is formed inside the large diameter portion,
a communication hole providing communication between a space in the recessed portion and the input chamber is formed in the spool,
the pressure receiving surface is provided in the recessed portion,
a pressure receiving body separating the space of the recessed portion from the space opposite to the housing land portion in a sealed manner is arranged inside of the spool so as to be relatively slidable with respect to the spool, and
the large diameter portion is slidable with respect to the housing.

3. The fluid control device according to claim 2, wherein
the pressure receiving body is a separate body from the housing.

* * * * *